United States Patent
Wang et al.

(10) Patent No.: US 12,314,771 B2
(45) Date of Patent: May 27, 2025

(54) PERCEPTION PROCESSING WITH MULTI-LEVEL ADAPTIVE DATA PROCESSING FLOW RATE CONTROL

(71) Applicant: GM GLOBAL TECHNOLOGY OPERATIONS LLC, Detroit, MI (US)

(72) Inventors: Shige Wang, Northville, MI (US); Wei Tong, Troy, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 817 days.

(21) Appl. No.: 17/478,135

(22) Filed: Sep. 17, 2021

(65) Prior Publication Data

US 2023/0093511 A1 Mar. 23, 2023

(51) Int. Cl.
*G06F 9/50* (2006.01)
*G06F 9/54* (2006.01)
*G06F 11/30* (2006.01)
*G06F 11/34* (2006.01)

(52) U.S. Cl.
CPC ............ *G06F 9/5066* (2013.01); *G06F 9/544* (2013.01); *G06F 11/3024* (2013.01); *G06F 11/3433* (2013.01)

(58) Field of Classification Search
CPC .... G06F 9/5066; G06F 9/544; G06F 11/3024; G06F 11/3433; G06F 11/3006
See application file for complete search history.

(56) References Cited

U.S. PATENT DOCUMENTS

| | | | | |
|---|---|---|---|---|
| 11,115,284 B1* | 9/2021 | Paiva | ..................... | H04L 41/082 |
| 2003/0120778 A1* | 6/2003 | Chaboud | ............... | G06F 9/5011 |
| | | | | 709/225 |
| 2007/0299980 A1* | 12/2007 | Amini | ................... | H04L 47/125 |
| | | | | 709/231 |
| 2008/0005392 A1* | 1/2008 | Amini | ..................... | H04L 47/30 |
| | | | | 710/29 |
| 2008/0320284 A1* | 12/2008 | Grzywna | .................. | G06T 1/20 |
| | | | | 712/E9.016 |
| 2009/0037926 A1* | 2/2009 | Dinda | ................... | G06F 9/4887 |
| | | | | 718/107 |
| 2014/0095701 A1* | 4/2014 | Liu | ...................... | H04L 41/0893 |
| | | | | 709/224 |
| 2017/0371675 A1* | 12/2017 | Chen | ...................... | G06F 9/3869 |
| 2020/0382617 A1* | 12/2020 | Trapane | .............. | H04L 67/1023 |
| 2022/0377016 A1* | 11/2022 | Chen | ........................ | H04L 47/52 |

* cited by examiner

*Primary Examiner* — Benjamin C Wu

(57) ABSTRACT

A perception processing system includes a memory and a main controller. The main controller includes modules and implements a data processing pipeline including algorithm stages, which are executed in parallel relative to sets of data and are executed sequentially relative to each of the sets of data. The algorithm stages share resources of the modules and the memory to process the sets of data and generate perception information. One of the modules executes global and local controllers. The global controller sets a processing rate for the local controllers. The local controllers monitor current processing rates of the algorithm stages. When one of the current processing rates is less than the set processing rate, the corresponding one of the local controllers sends a first signal to the global controller and in response the global controller sends a broadcast signal to the local controllers to adjust the current processing rates.

19 Claims, 9 Drawing Sheets

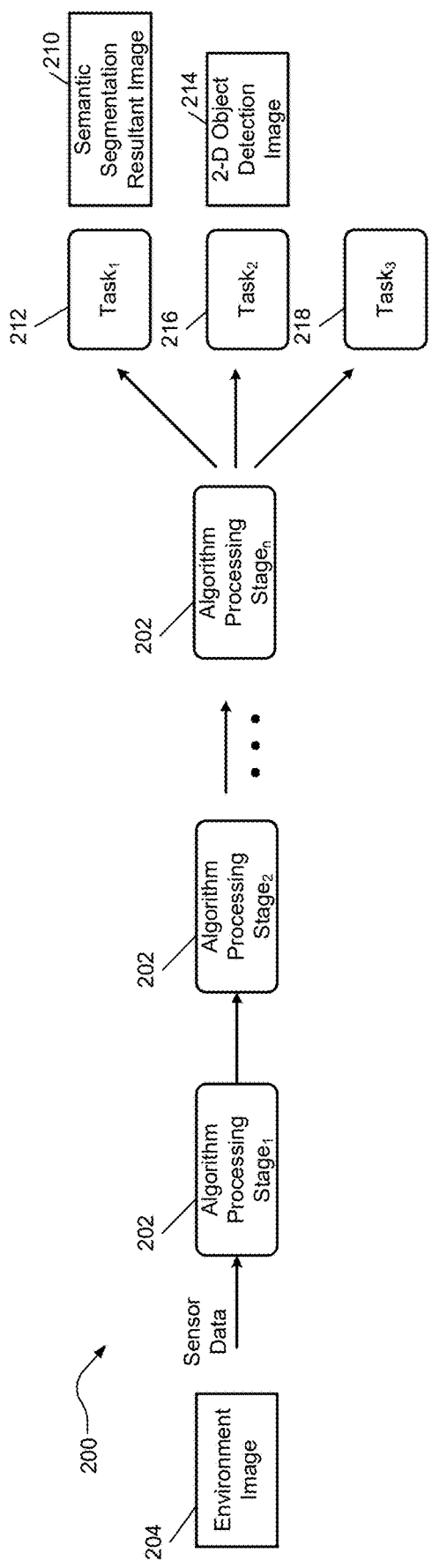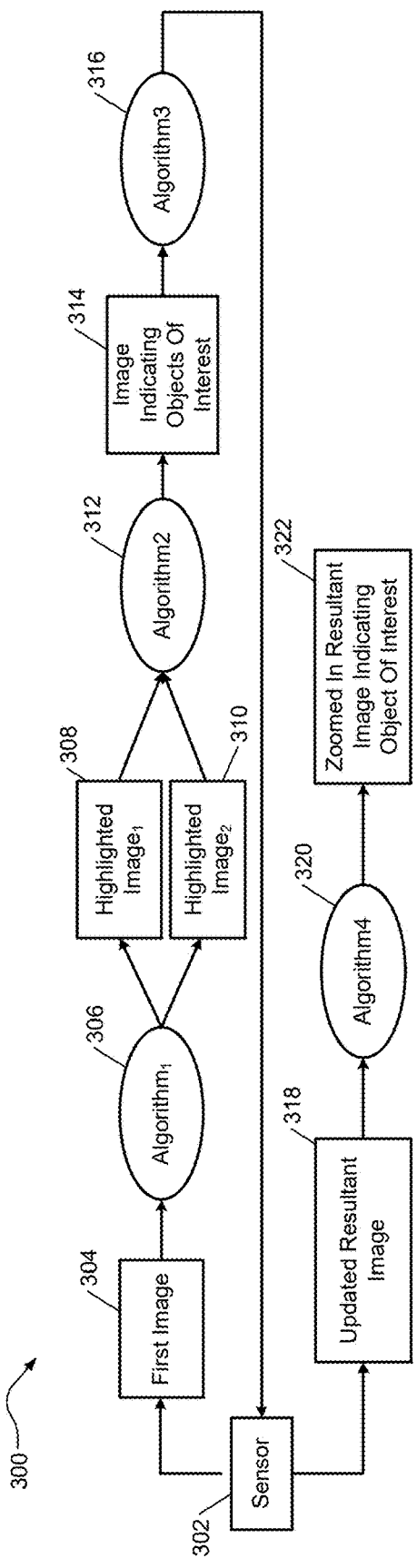
FIG. 2
FIG. 3

PERCEPTION PROCESSING WITH MULTI-LEVEL ADAPTIVE DATA PROCESSING FLOW RATE CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle object detection systems, and more particularly to vehicle perception processing systems.

Vehicles can include various sensors for detecting a surrounding environment and objects in that environment. The sensors may include cameras, radio detection and ranging (RADAR) sensors, LIDAR sensors, ultrasonic sensors, etc. A vehicle controller can, in response to the detected surroundings, perform various operations. The operations can include performing partial and/or fully autonomous vehicle operations, collision avoidance operations, and informational reporting operations. The accuracy and validity of the performed operations can be based on the age and accuracy of the data collected from the sensors.

SUMMARY

A perception processing system is provided and includes a memory and a main controller. The main controller includes modules and is configured to implement a data processing pipeline including algorithm stages. The algorithm stages are executed in parallel relative to sets of data and are executed sequentially relative to each of the sets of data. The algorithm stages share resources of the modules and the memory to process the sets of data and generate perception information. One of the modules is configured to execute a global controller and local controllers. The global controller is configured to set a processing rate for the local controllers. The local controllers are allocated respectively to and monitor current processing rates of the algorithm stages. When one of the current processing rates is less than the set processing rate, the corresponding one of the local controllers is configured to send a first signal to the global controller. The global controller is configured to send a broadcast signal to the local controllers to adjust the current processing rates based on the first signal.

In other features, the modules include a central processing module and an accelerator module. The one of the modules is implemented as the central processing module. The accelerator module is configured to assist the central processing module in executing the plurality of algorithm stages to process the plurality of sets of data.

In other features, the algorithm stages are implemented respectively by processing blocks having respective input buffers. The local controllers are configured to respectively determine the current processing rates based on at least one of (i) an initial timestamp of a first in series one of the processing blocks, (ii) timestamps of when data is received at the input buffers, or (iii) timestamps of when the processing blocks finish processing data.

In other features, the global controller and the local controllers are configured to: when the one of the current processing rates is less than the set processing rate for one of the processing blocks, clear the input buffers of the processing blocks and adjust operation of the local controllers to a minimum processing rate; and when a current achievable processing rate for the one of the processing blocks is greater than the minimum processing rate, ramp up processing speeds of the processing blocks from the minimum processing rate to at least one of a current set rate set by the global controller or a target rate, wherein the target rate is greater than or equal to the current set rate.

In other features, only one of the local controllers signals the global controller during a processing iteration of the data processing pipeline; and the global controller sends the broadcast signal to the local controllers in response to the one of the local controllers signaling the global controller.

In other features, one of the local controllers signals the global controller at least one of (i) a current processing rate of a processing block of the one of the local controllers, or (ii) a current achievable processing rate of the processing block. The global controller sets an updated processing rate for the local controllers in response to the one of the local controllers signaling the global controller.

In other features, one of the local controllers is configured to request additional resources when a current delay of a processing stage of the one of the local controllers is greater than an allocated available stage delay for the processing stage of the one of the local controllers.

In other features, each of the local controllers are configured to refrain from sending a message to the global controller when a current achievable processing rate of that local controller is greater than or equal to a target processing rate for the data processing pipeline.

In other features, the first signal indicates an achievable processing rate for the corresponding one of the local controllers. The global controller is configured to generate the broadcast signal to adjust the current processing rates to the achievable processing rate.

In other features, the perception processing system further includes: a sensor configured to generate the sets of data; and the main controller is configured to control operation of at least one actuator based on the perception information.

In other features, a perception processing method is provided and includes: implementing, via a main controller, a data processing pipeline including algorithm stages, where the main controller includes modules; executing, via the modules, the algorithm stages in parallel relative to multiple sets of data and sequentially relative to each of the sets of data, where the algorithm stages share resources of the modules and a memory to process the sets of data and generate perception information; and via one of the modules, executing a global controller and multiple local controllers. The method further includes setting a processing rate for the local controllers via the global controller; monitoring current processing rates respectively of the algorithm stages via the local controllers, where the local controllers are allocated respectively for the algorithm stages; when one of the current processing rates is less than the set processing rate, sending from the corresponding one of the local controllers a first signal to the global controller; and sending a broadcast signal from the global controller to the local controllers to adjust the current processing rates based on the first signal.

In other features, the perception processing method further includes assisting, via an accelerator module, a central processing module in executing the algorithm stages to process the sets of data. The modules include the central processing module and the accelerator module. The one of the modules is implemented as the central processing module.

In other features, the perception processing method further includes determining the current processing rates respectively via the local controllers based on at least one of (i) an initial timestamp of a first processing block, (ii) timestamps of when data is received at the input buffers, or (iii) timestamps of when processing blocks finish processing data, where: the plurality of algorithm stages are implemented respectively by the processing blocks; the processing blocks include respective input buffers; and the processing blocks include the first processing block.

In other features, the perception processing method further includes: when the one of the current processing rates is less than the set processing rate for one of the processing blocks, clearing the input buffers of the processing blocks and adjusting operation of the local controllers to a minimum processing rate; and when a current achievable processing rate for the one of the processing blocks is greater than the minimum processing rate, ramping up processing speeds of the processing blocks from the minimum processing rate to at least one of a current set rate set by the global controller or a target rate, wherein the target rate is greater than or equal to the current set rate.

In other features, the perception processing method further includes: signaling only once from only one of the local controllers the global controller during a processing iteration of the data processing pipeline; and sending from the global controller the broadcast signal to the local controllers in response to the one of the local controllers signaling the global controller.

In other features, the perception processing method further includes: signaling, via one of the local controllers, the global controller at least one of (i) a current processing rate of a processing block of the one of the local controllers, or (ii) a current achievable processing rate of the processing block; and setting an updated processing rate via the global controller for the local controllers in response to the one of the local controllers signaling the global controller.

In other features, the perception processing method further includes requesting, via one of the local controllers, additional resources when a current delay of a processing stage of the one of the local controllers is greater than an allocated available stage delay for the processing stage of the one of the local controllers.

In other features, the perception processing method further includes refraining, via each of the local controllers, from sending a message to the global controller when a current achievable processing rate of that local controller is greater than or equal to a target processing rate for the data processing pipeline.

In other features, the perception processing method further includes generating, via the global controller, the broadcast signal to adjust the current processing rates to an achievable processing rate, where the first signal indicates the achievable processing rate for the corresponding one of the local controllers.

In other features, the perception processing method further includes: generating the sets of data via at least one sensor; and controlling operation of at least one actuator based on the perception information.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is an example perception system model including multi-stage flow in accordance with the present disclosure;

FIG. 3 is an example multi-stage feedback process model in accordance with the present disclosure;

In the drawings, reference numbers may be reused to identify similar and/or identical elements.

DETAILED DESCRIPTION

Figure 1:
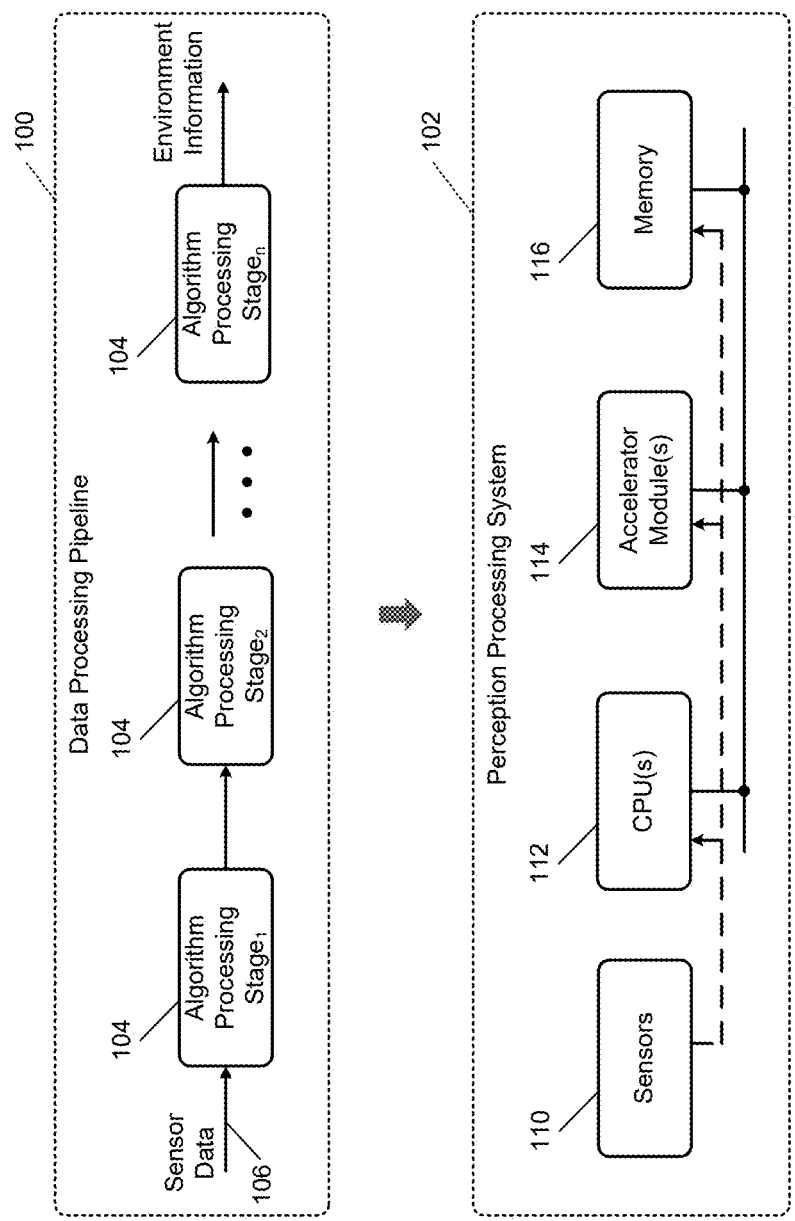
FIG. 1 illustrates an example data processing pipeline and perception processing system in accordance with the present disclosure.

An autonomous driving module may perform perception and localization operations and path planning and vehicle control operations. The stated operations may be performed based on data collected from various sensors, such as short and long range LIDAR sensors, short and long range RADAR sensors, cameras, ultrasonic sensors, and an inertial measurement sensor (or inertial measurement unit) and data collected from a global positioning system (GPS). Perception refers to the monitoring of vehicle surroundings and the detection and identification of various features and/or objects in the surroundings. This can include determining various aspects of the features and objects. The term "feature" as used herein refers to one or more detected points that can be reliably used to determine a location of an object. This is unlike other data points detected, which do not provide reliable information regarding location of an object, for example, a point on a leaf or branch of a tree. The aspects determined may include object distances, locations, sizes, shapes, orientation, trajectories, etc. This may include determining the type of object detected, for example whether the object is a traffic sign, a vehicle, a pole, a pedestrian, a ground surface, etc. Lane marking information may also be detected. A feature may refer to a surface, edge, or corner of a building. Localization refers to information determined about a host vehicle, such as location, speed, heading, etc.

Path planning and vehicle control (e.g., braking, steering, and accelerating) are performed based on the gathered perception and localization information.

A large amount of data may be collected from the sensors. This data may be continuously collected and can require a large amount of resources to collect, store and perform computations based on the collected data. This is particularly true for perception operations. The speed at which the collected data is processed can vary and depends on the current available resources. When the processing speed decreases, this can cause a "bottleneck" and processing of the currently stored data may get delayed making the results of the processing obsolete.

As an example, if a target processing rate is 30 frames per second (30 f/s), but a slow down in processing results in a processing rate of 20 f/s, an abundance of frames can be collected in a buffer. As a result processing of a frame could be delayed 2-3 seconds. A 2-3 second delay can result in an object that was of concern, passing and no longer being of concern and thus any operations performed to avoid the object may now be inappropriate. In other words and in this situation, the data being processed no longer reflects the current real world environment of the host vehicle. In order for the processing system to keep up with the incoming data, the rate at which data is collected may need to be reduced to 20 f/s, however this may result in the vehicle not responding quick enough for certain situations.

The examples set forth herein include adaptive perception processing systems that each execute multiple sequentially implemented algorithms (referred to as "algorithm processing stages"), which are executed in parallel for data collected at different times. Each algorithm process stage may be implemented as a process or thread and by a neural network or a portion of a neural network. As an example, a first algorithm processing stage may process a first frame and an output of the first algorithm processing stage may be passed to a second algorithm stage. The second algorithm processing stage processes the output of the first algorithm processing stage while the first algorithm processing stage processes a next frame. Any number of algorithms processing stages may be implemented. Each of the perception processing systems determines processing rates of the corresponding processing stages and adaptively adjusts an overall processing rate based on the slowest algorithm processing stage. The perception processing systems are able to quickly reduce a processing rate of multiple algorithm processing stages and slowly ramp up the rates of the algorithm processing stages based on determined achievable processing rates. Available processing resources (or hardware) are adapted to reliably process data at rates that allow for quick and appropriate responses.

The disclosed examples define an architecture and operations to enable adaptive processing of a perception system involving multi-stage parallel implemented algorithms, by controlling the processing using a flow model for continuous operations. The flow control includes determining end-to-end flow rates with local adjustment of computations at interested algorithm processing stages and devices. The examples further define a modularized architecture using feedback flow control to manage flow rates. The architecture adopts two-level control including a single global controller and multiple local controllers. Each of the local controllers is used for one algorithm processing stage. This two-level control structure includes cooperative decision making between local and global controllers. A protocol is defined between global and local controllers such that, in one embodiment and during each process loop (or iteration of a data pipeline process including multiple algorithm processing stages), communication between controllers is limited to (i) a single signal from a local controller to a global controller, and (ii) a single broadcast signal from the global controller to the local controllers.

The perception systems employ a fast-fallback and slow-recover method for prompt adaptation while maintaining stability. The term "fast-fallback" refers to a quick reduction in a data pipeline processing rate to a minimum rate by all local controllers processing perception data in the corresponding data pipeline. The term "slow-recover" refers to the global controller slowly ramping up a processing rate of the local controllers. These terms are further described below along with corresponding examples.

FIG. 1 shows a data processing pipeline 100 and perception processing system 102. The data processing pipeline 100 includes algorithm processing stages 104 that are implemented sequentially relative to a set of data (e.g., a frame of data) and executed in parallel for different sets of data (e.g., different frames of data). A first one of the algorithm processing stages 104 receives sensor data 104 from one or more sensors (e.g., any sensors referred to herein) and generates an output. As an example, the first algorithm processing stage may be implemented by a multi-task network and output a region of a cropped image. A second (or subsequent) algorithm processing stage processes the output of the first (or previous) algorithm processing stage and generates another output. As an example, the second algorithm processing stage may be implemented by a neural network (e.g., a real time object detection network) and provide two-dimensional (2D) bounding boxes of detected objects in the region of the cropped image. A third (or subsequent) algorithm processing stage processes the output of the second (or previous) algorithm processing stage. As an example, the third algorithm processing stage may be implemented as a three-dimensional (3D) box neural network and output 3D bounding boxes around objects (e.g., vehicles, pedestrians, signs, poles, buildings, trees, etc.) of interest.

The perception processing system 102 may include sensors 110, one or more central processing units CPUs 112, one or more accelerator modules 114 and memory 116. Each of the CPUs 112 may implement one or more controllers including local controllers and global controllers, as further described below. In one embodiment, a single CPU implements multiple local controllers and a single global controller that communicates with the local controllers. In another embodiment, a first CPU implements a global controller and the first CPU and/or one or more other CPUs implement multiple local controllers. Each of the algorithm processing stages 104 may be implemented by the CPUs 112 and accelerator modules 114 and share the memory 116. The CPUs 112 perform adaptive data pipeline flow rate control of perception data processing operations performed by the CPUs 112 and/or the accelerator modules 114. As used herein, the terms CPU and GPU may be referred to as central processing modules and graphics processing modules.

Each of the accelerator modules 114 may include a graphics processing unit, a field programmable gate array (FPGA), an application specific integrated circuit (ASIC), and/or other hardware assistance circuit. The accelerator modules 114 may receive computations and/or data from the CPUs 112 to implement and/or process. The accelerator modules 114 may perform the data processing performed at each algorithm processing stage (or algorithm stage).

FIG. 2 shows a perception system model 200 including multiple algorithm processing stages 202, as described above, that are implemented sequentially with respect to a set of data and in parallel for respective sets of data. A first one of the algorithm processing stages 202 receives sensor data taken at a particular time for an environment, such as an image 204 of an area forward of a vehicle. Other sensor data may be collected. Each subsequent algorithm processing stage receives an output of the previous algorithm processing stage. Multiple tasks may be performed based on the output of the last algorithm processing stage. As an example, the last algorithm processing stage may indicate objects of interest and corresponding related information, such as locations, trajectories, speeds, and/or other parameters associated with the objects of interest. Tasks may be performed based on the detected objects of interest and the stated corresponding information. This may include controlling vehicle operations such as steering, braking, accelerating, vehicle visual and audible indicator control, etc.

In the example shown, a semantic segmentation result image 210 is shown for a first task 212, a 2-D object detection image 214 is shown for a second task 216, and a third task 218 is shown. The images 210, 214 may be provided as results of the last algorithm processing stage. The first task 212 may be based on the semantic segmentation result image 210, which includes an image of an environment with different color highlighting of different areas of interest. The second task 216 may be performed based on the 2-D object detection image 214, which may include one or more boxes around one or more objects of interest. The tasks may be performed by one or more of the CPUs 112 of FIG. 1 and/or the vehicle control system shown in FIG. 4. The tasks may include feedback operations, such as operations to adjust operations of sensors.

FIG. 3 shows a multi-stage feedback process model 300 that includes a sensor 302 (e.g., a camera), which generates a first set of data (e.g., data points of a first frame (or image)). An example image 304 is shown. A first algorithm processing stage 306 processes the first set of data to generate a first output including a second set of data. As an example, the first output may include one or more images 308, 310, which are similar to the first image, but include highlighted areas of interest (e.g., shading areas of interest certain colors). A subsequent and/or second algorithm processing module 312 may process the first output to provide a second output including a third set of data. As an example, the second output may include an image 314 indicating one or more objects of interest. As an example, one or more indicator objects (e.g., a circle, a rectangle, etc.) may be overlaid on an object in an image to indicate that the object is of interest. A subsequent and/or third algorithm processing module 316 processes the second output to provide a feedback signal to adjust operation of the sensor 302. In addition to adjusting operation of the sensor, other operations, such as actuation operations (e.g., steering, braking, etc.) may be performed. This adjustment may include adjusting focus and/or direction of the camera to zoom in on one or more objects of interest. Subsequent to the feedback operation being performed, another image 318 may be generated by the sensor. A subsequent and/or fourth algorithm processing module 320 may process data associated with image 318 and provide a resultant image 322 zoomed in on and identifying the one or more objects of interest. Various tasks, such as object avoidance and/or countermeasure tasks may then be performed based on this information.

Figure 4:
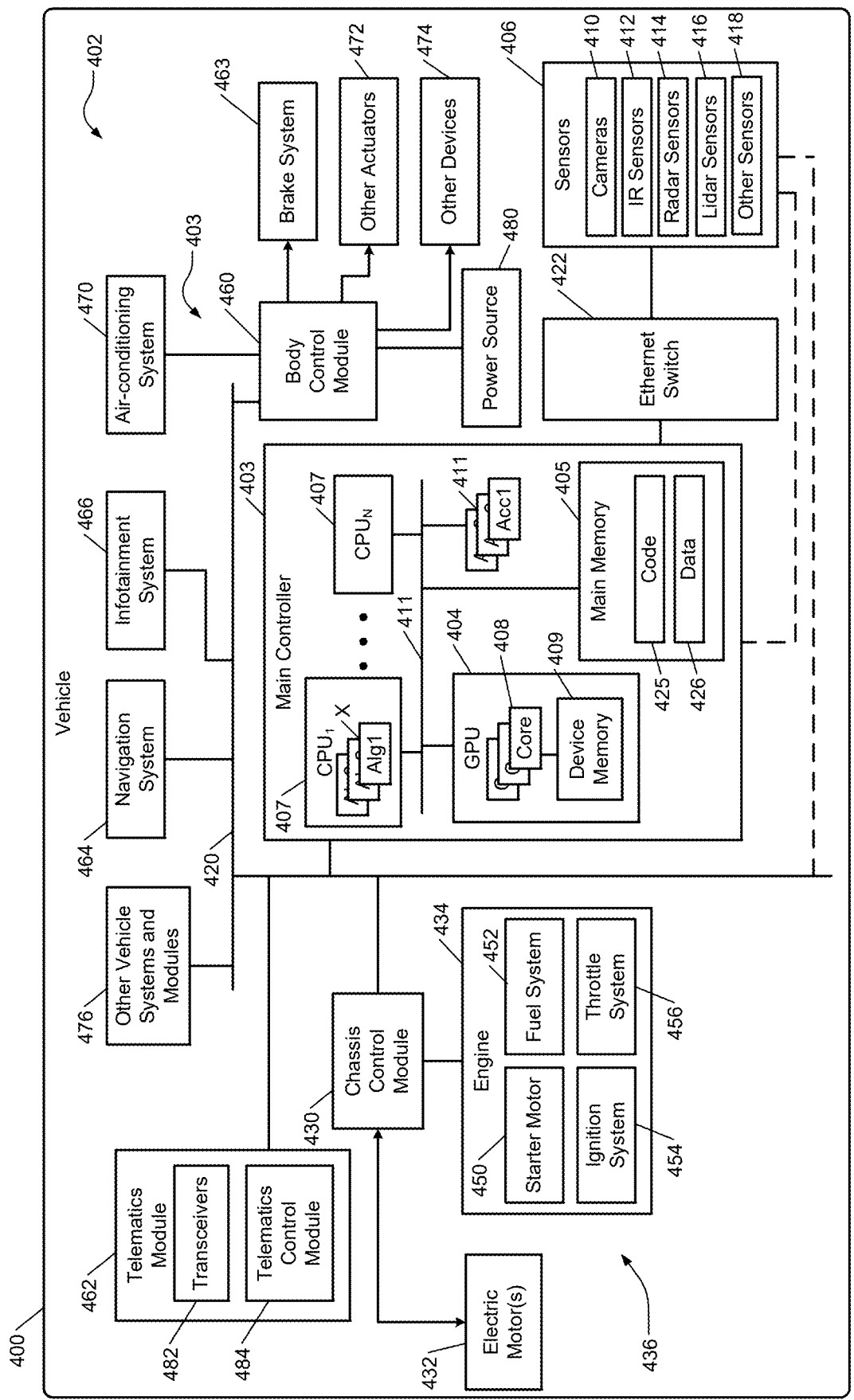
FIG. 4 is a functional block diagram of an example vehicle middleware framework including perception processing system in accordance with the present disclosure.
Figure 5:
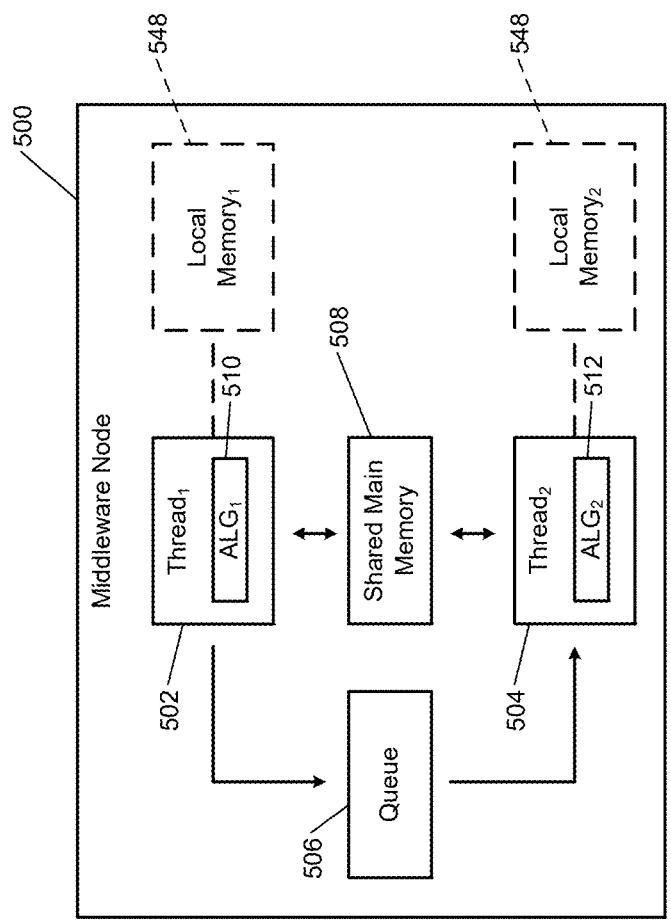
FIG. 5 is a functional block diagram of an example middleware node including threads and accessing a queue and a shared main memory in accordance with the present disclosure.

FIG. 4 shows a vehicle 400 including a vehicle middleware framework 402 configured to implement middleware nodes and corresponding algorithms as respective threads. The vehicle 400 includes a perception processing system 403. The perception processing system 403 may include the perception processing system 102 of FIG. 1. The vehicle 400 may be a partially or fully autonomous vehicle or other vehicle. An example middleware node is shown in FIG. 5. The middleware framework 402 may include one or more main controllers (one controller 403 is shown) and sensors 406. The main controllers implement a middleware service, which may include open source software and include execution of middleware nodes. The middleware service and corresponding system provides transparency between applications and hardware. The middleware system is not an operating system and makes implementation of applications easier. The middleware system allows for transparent communication between applications. This means that the applications can be located anywhere, such as in a same computer, a vehicle memory, an edge cloud computing device, a cloud-based network device, or elsewhere. The applications may run on a same core or different cores. If one application calls the middleware service to reach a second application, a signal is generated and routed to the second application by the middleware service.

Each of the main controllers may implement a respective neural network and include one or more processors (or cores). In one embodiment, the main controllers implement respective convolutional neural networks. Each middleware node may be implemented on one or more cores (or CPUs) of a selected one of the main controllers. Each middleware node cannot be implemented on more than one of the controllers. In addition to implementing middleware nodes as threads and as part of a single process, one or more of the main controllers may also implement middleware nodes as separate processes.

Each of the main controllers may include: CPUs (or central processing modules) 407 (e.g., the CPUs 112 of FIG. 1); a GPU 404 and/or other accelerator modules 411 (e.g., the accelerator modules 114 of FIG. 1); and a main memory 405 (e.g., the memory 116 of FIG. 1). The GPU 404 may include cores 408 and a device memory 409. The CPUs 407, the GPU 304 and the main memory 405 may communicate with each other via an interface (or bus) 411. The perception processing system 403 may include the main controller 403 and/or other main controllers, the CPUs 407, the accelerator modules 404, 411 and the main memory 405. The perception processing system 403 is further described below with respect to FIGS. 6-10.

The sensors 406 may be located throughout the vehicle 400 and include cameras 410, infrared (IR) sensors 412, RADAR sensors 414, LIDAR sensors 416, and/or other sensors 418. The controllers and sensors 406 may be in direct communication with each other, may communicate with each via a bus 420 (e.g., controller area network (CAN) bus or other high-speed communication bus), and/or via an Ethernet switch 422. In the example shown, the sensors 406 are connected to the controllers via the Ethernet switch 422, but may also or alternatively be connected directly to the main controllers 403 and/or the bus 420. The main memory 405 may store, for example, code 425 and data 426. The data 426 may include sensor data, parameters referred to herein, and other data. The code 425 may include algorithms (or algorithm processing stages) referred to herein.

The vehicle 400 may further include a chassis control module 430, torque sources such as one or more electric motors 432 and one or more engines (one engine 434 is shown). The chassis control module 430 may control distribution of output torque to axles of the vehicle 400 via the torque sources. The chassis control module 430 may control operation of a propulsion system 436 that includes the electric motor(s) 432 and the engine(s) 434. The engine 434 may include a starter motor 450, a fuel system 452, an ignition system 454 and a throttle system 456.

The vehicle 400 may further include a body control module (BCM) 460, a telematics module 462, a brake system 463, a navigation system 464, an infotainment system 466, an air-conditioning system 470, other actuators 472, other devices 474, and other vehicle systems and modules 476. The other actuators 472 may include steering actuators and/or other actuators. The controllers, systems and modules 403, 430, 460, 462, 464, 466, 470, 476 may communicate with each other via the CAN bus 420. A power source 480 may be included and power the BCM 460 and other systems, modules, controllers, memories, devices and/or components. The power source 480 may include one or more batteries and/or other power sources. The controllers 403 may and/or the BCM 460 may perform countermeasures and/or autonomous operations based on detected objects, locations of the detected objects, and/or other related parameters. This may include controlling the stated torque sources and actuators as well as providing images, indications, and/or instructions via the infotainment system 466.

The telematics module 462 may include transceivers 482 and a telematics control module 484, which may be used for communicating with other vehicles, networks, edge computing devices, and/or cloud-based devices. The BCM 460 may control the modules and systems 462, 463, 464, 466, 470, 476 and other actuators, devices and systems (e.g., the actuators 472 and the devices 474). This control may be based on data from the sensors 406.

FIG. 5 shows an example of one middleware node 500 may be a function that receives requests and response objects. Multiple middleware nodes may be implemented, which may communicate with each other. The middleware nodes may be programs, applications and/or programs running as part of an application. The middleware node 500 may including threads 502, 504 and accessing a queue 506, a shared main memory 508, and possibly local memory 548. Although the middleware node 500 is shown having two threads, the middleware node 500 may include one or more threads. Each of the threads 502, 504 may implement a respective algorithm or portion of a single algorithm.

As an example, the first thread 502 may perform a detection algorithm and the second thread 504 may perform a segmentation and/or object aligning algorithm. As shown, the first thread 502 implements a first algorithm 510 and the second thread 504 implements a second algorithm 512. The threads 510, 512 may have access to respective local memories 514, 516. The queue 506 may refer to a portion of the main memory 505 of FIG. 4, remotely located memory, or a combination thereof. The shared main memory 508 refers to a portion (or assigned address region) of the main memory 505 that is shared by and accessible by each of the threads 510, 512 (or one or more cores implementing the threads). The threads 502, 504 are implemented as being part of a same process, although the operations may have traditionally been implemented as two or more separate processes. Since the threads are implemented as being part of a same process, the threads are able to share a same main memory region. This allows the code and data associated with the threads (referred to as thread code and thread data) and a GPU to be located near each other in the main memory. Being part of the same process, allows computations for the threads to be implemented concurrently by the GPU.

The threads of the middleware node 500 are defined statically when the middleware node 500 is defined. Data shared among the threads is defined in a middleware node space for access protection. One or more queue(s) may be used for data communications and may respectively correspond to the algorithms implemented by the middleware nodes. All threads, shared data variables and queues may be configured when the middleware node 500 is initialized.

Each of the threads may be defined with properties supporting parallel execution. Each of the threads may include program statements, such as a commQList, a sharedMList, a gpuStreamList, a schedParam, an init( ) function, a run( ) function, and/or other program statements. The commQList is used to connect to the queues for transfer of small amounts of data (e.g., object detection and/or identification data) between threads and/or memory spaces. The sharedMList is used to connect to the shared main memory 508 for transfer of large amounts of data (e.g., data associated with an image).

The gpuStreamList is used to connect to channels for GPU computation. The schedParam may include parameters for scheduling when a resource contention exists between two or more threads. The schedParam may be used when arbitration is performed to determine which thread to execute. Threads may be executed concurrently and when there is a limited resource, the schedParam may be used to determine and/or identify which thread is able to use the resource first. The init( ) function is an initialization function that is used to initialize queues, shared memory, the gpuStreamList program statement, and the schedParam program statement for the threads. The run( ) function is a function implemented for normal execution of an algorithm. The init( ) and run( ) functions may be used to convert a middleware node for a process to a thread.

The middleware node 500 allows for parallel processing of threads, which allows larger amounts of data to be processed. For example, processing of 10 frames per second of eight megabyte images instead of 10 frames per second of 1 megabyte images. A GPU may include hundreds of cores (e.g., 256 cores) and only a portion of the cores is traditionally used by a single middleware node at a time. The GPU would traditionally execute the algorithm computations for a first middleware node before executing the algorithm computations for a second middleware node. The GPU was traditionally not able to process information for images for two middleware nodes concurrently. As another example, due to the sequential time multiplexed implementation of the computations, only 20% of the cores of a GPU may be used to execute an algorithm for a middleware node while the other 80% of the cores are idle. The parallel GPU processing of thread computations as disclosed herein allows for a higher percentage utilization of GPU cores at a given moment in time.

Figure 6:
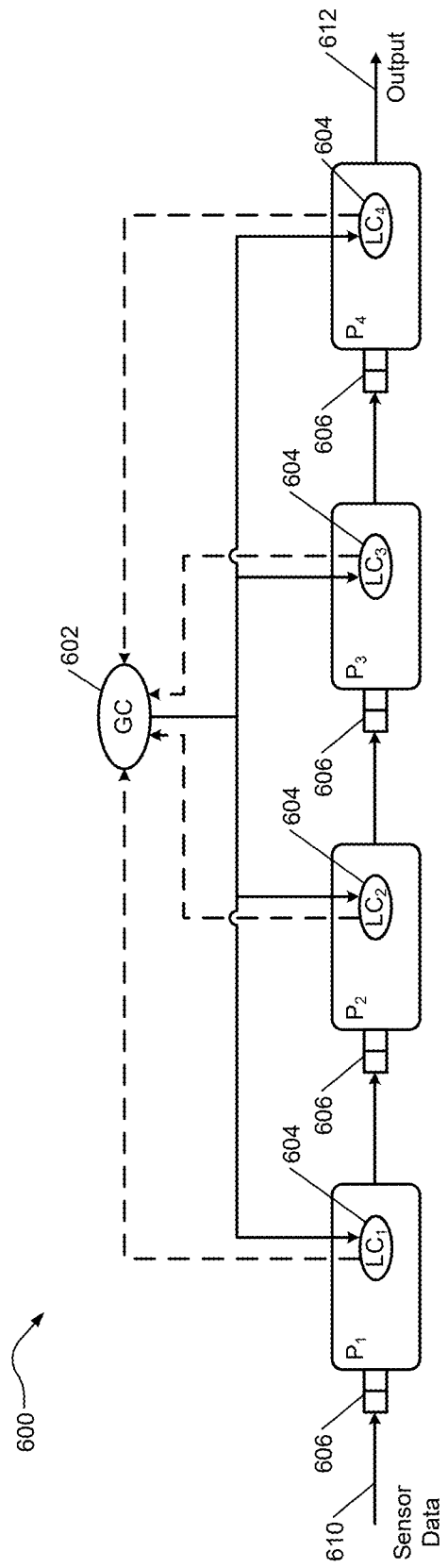
FIG. 6 is a functional block diagram of an adaptive perception processing system in accordance with the present disclosure.

FIG. 6 shows an adaptive perception processing system 600 that includes processing blocks $P_i$, where i is the number of the processing block, and a global (or end-to-end (e2e)) controller 602. FIG. 6 is a model of the processing as a sequence of computation stages referred to as the processing blocks $P_i$. Each processing block $P_i$ may be implemented as a process or thread and includes a local controller 604 and a buffer 606. Although four processing blocks are shown, any number of processing blocks $P_i$ may be included. Each processing block is wrapped with an execution unit (e.g., a process or thread) and is associated with an algorithm processing stage and execution of a respective algorithm including performing computations $S_i$ at that stage i, where i is an integer greater than or equal to 1. Each stage is modeled as a basic architecture block that is activated by data availability at a corresponding one of the input buffers 606 and thus is data-flow driven and performs one or more computations.

Each of the input buffers 606 receives data from one or more sensors or from a previous processing block. The input buffers 606 may each be the same size to store the same amount of data. Each of the input buffers 606 may refer to an allocated portion of memory (e.g., portion of main memory 405 of FIG. 4). Sensor data is represented by signal 610. The last processing block outputs a signal 612. The signal 612 may include: environment information such as object of interest information as described above; sensor feedback signals; actuation control signals, etc., which may be received by a CPU, controller, sensor, actuator, and/or other device. Multiple actuators are shown in FIG. 4.

Each of the local controllers 604 may compute a real achievable processing rate r(t) for the respective one of the processing blocks $P_i$ at the end of processing a respective set of data (e.g., a frame of data). Each of the local controllers 604 may compare the real achievable processing rate r(t) of the processing block of that controller to a target rate $R_{tar}$, a current set rate $R_c$, and/or a minimum rate $R_{min}$. The current set rate $R_c$ is less than or equal to the target rate $R_{tar}$ and is greater than or equal to the minimum rate $R_{min}$. As an example, the target rate $R_{tar}$ may be 30 f/s and the minimum rate $R_{min}$ may be 20 f/s. The target rate $R_{tar}$ and the minimum rate $R_{min}$ may be different than the example values stated. Each of the local controllers 604 may then determine, based on these comparisons, whether to signal the global controller 602 and/or other controller, CPU, accelerator module, and/or device indicating whether the local controller is satisfying and/or able to satisfy $R_{tar}$, current set rate $R_c$ and/or $R_{min}$. The local controller that signals the global controller 602 may indicate a current achievable rate of that local controller. The global controller 602 may then broadcast a feedback signal indicating an updated rate to the local controllers 604. The same set rate is assigned to the local controllers 604. The global controller determines the achievable rate for the collective processing blocks $P_i$ based on flow input and output information. The control of data processing flow rate is achieved through implicit cooperation of local controllers 604 based on global controller feedback.

The local controllers 604, in response to the feedback signal, then adjust respective processing rates to match the new set rate. If one of the processing blocks $P_i$ is not able to satisfy the current set rate $R_c$, then the global controller 602 may reduce the processing rate to $R_{min}$ for all of the processing blocks $P_i$. If all of the processing blocks $P_i$ are able to exceed $R_{min}$, then the global controller 602 may gradually increase the processing rate over multiple loops (or iterations) of a data processing pipeline to the target rate $R_{tar}$ or a maximum rate between $R_{min}$ and $R_{tar}$ that is able to be satisfied by all of the processing blocks $P_i$.

The local controllers 604 then control processing performed at the current set updated rate $R_c$. The local controllers that are able to satisfy the target rate $R_{tar}$ and/or the current set rate $R_c$ may not signal the global controller, thereby, minimizing the number of signals sent to the global controller 602. The local controller that is not satisfying the minimum rate $R_{min}$ may request additional resources to be allocated to the processing block of that local controller to allow for increased local processing speed.

The global controller 602 and the local controllers 604 may be implemented by, for example, one or more of the CPUs 112 and 407 of FIGS. 1 and 4. The global controller 602 and the local controllers 604 have respective code executed in parallel with code of algorithm processing stages (or algorithms) implemented by the processing stages $P_i$. Each of the local controllers 604 may control execution of the corresponding one of the processing blocks $P_i$ and monitor a state of a respective one of the input buffers 606. Each of the local controllers 604 may also timestamp data when received at the input buffer, timestamp outputs of the corresponding output block, and determine delay time associated with processing data based on a difference between these timestamps. Each local controller 604 may also perform its own informed decision making in response to the feedback signal from the global controller.

Figure 7:
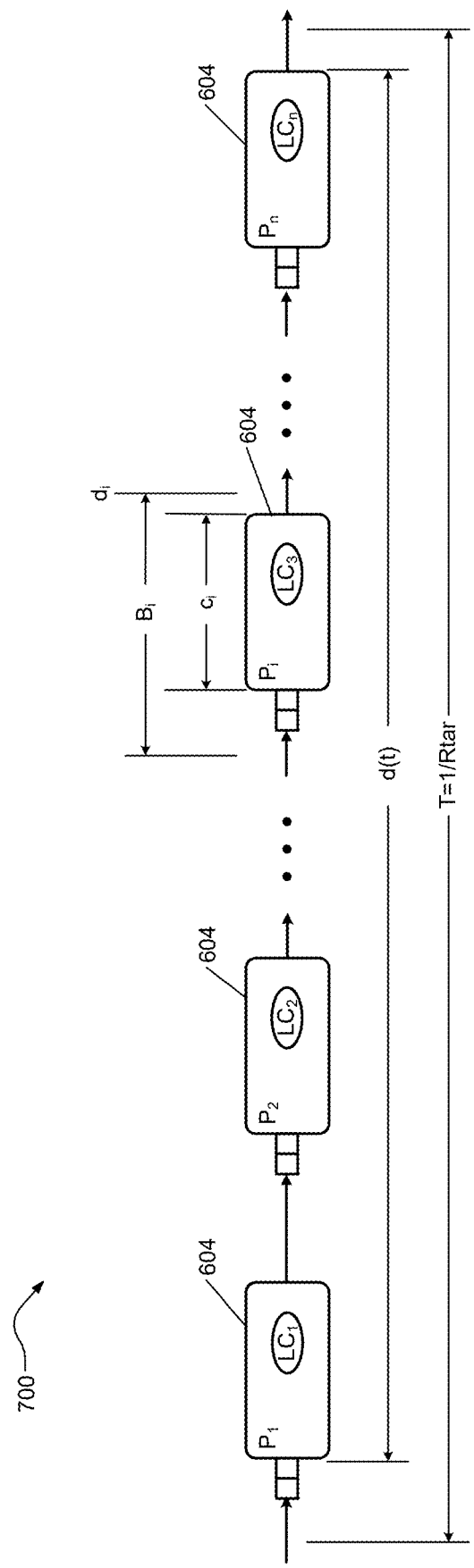
FIG. 7 is a flow model of the adaptive perception processing system of FIG. 6 illustrating corresponding parameters in accordance with the present disclosure.

FIG. 7 shows a flow model 700 of the adaptive perception processing system of FIG. 6, where: $d_i$ is the latest time that a respective processing block can finish processing a current set of data; $B_i$ is an allowed computation delay of one of the processing modules $P_i$ in an ideal situation; a is computation delay of the $i^{th}$ one of the processing modules $P_i$ without interference; d(t) is measured e2e delay for input at time t, which is used for monitoring e2e throughput; T is allowed e2e processing delay for the processing blocks 1-n; and $R_{tar}$ is the target data processing flow rate. The values of $B_i$, d(t), $d_i$, $r_i(t)$, and r(t) may be determined according to equations 1-5, where: $r_i(t)$ is the achievable rate of the $i^{th}$ processing block; r(t) is the overall achievable rate for the processing pipeline including the processing blocks $P_i$; $c_i(t)$ is a measured computation delay of the $i^{th}$ processing block $P_i$ for input time t; $R_{min}$ is the minimum data processing flow rate for correct system behavior; and $c_k$ is delay of a $k^{th}$ one of the processing blocks $P_i$.

$$B_i = c_i + c_i\left(1 - \frac{\sum_{k=1}^{n} c_k}{T}\right) \quad (1)$$

$$d(t) = \overline{\sum_{k=1}^{n} c_k(t)} \quad (2)$$

$$d_i = \frac{1}{R_{min}} - \sum_{k=i+1}^{n} c_k \quad (3)$$

$$r_i(t) = \frac{1}{\left(\sum_{k=1}^{i} c_k(t) + \sum_{k=i+1}^{n} c_k\right)} \quad (4)$$

$$r(t) = \begin{cases} R_{tar} & \text{if } \frac{1}{d(t)} \geq R \\ \frac{1}{d(t)} & \text{if } R_{min} < \frac{1}{d(t)} < R_{tar} \\ R_{min} & \text{if } R_{min} \geq \frac{1}{d(t)} \end{cases} \quad (5)$$

The values $R_{tar}$ and $R_{min}$ may be constant preset values. The values $c_i$, $d_i$, $B_i$ are function properties obtained when the perception processing system is designed. The values c(t), d(t), and r(t) are measured and/or computed values. The latest completion time for $i^{th}$ processing block $P_i$ is represented by equation 3 and the processing rate of processing block $P_i$ is represented by equation 4.

The processing rate of the processing blocks $P_i$ are adjusted (adaptive control) when $$R_{min} < \frac{1}{d(t)} < R_{tar}.$$

When the processing rate is $$\frac{1}{d(t)}$$

the results are acceptable, but not as good as when the processing rate is $R_{tar}$. When the processing rate is less than $R_{min}$, additional resources are requested for the processing block unable to process data at a rate greater than or equal to $R_{min}$. Data processing rates less than $R_{min}$ may not provide valid results.

The local controllers 604 of the processing blocks $P_i$ record timestamps of the inflow and outflow of data at each stage, as described above. A message structure is implemented by the local controllers 604 to pass messages from each of the local controllers 604 to a next one of the local controllers 604 and/or device downstream from that local controller. In an embodiment, an initial timestamp is recorded when a set of data is initially received at the first processing block. The initial timestamp is forwarded to each subsequent processing block. An example of the message structure is represented by equation 6, where $msg_i$ is the $i^{th}$ message; id is a unique identifier for the processing block of information (e.g., an image, data, a signal or a counter value); ts_0 is the timestamp when data is (i) initially generated, or (ii) received at a buffer of the first processing stage, and remains constant through all stages; ts_e is a timestamp when data is sent from a processing block and computation of that processing block is complete and is updated at each stage; and data is the data output at each processing block (or stage) and passed to the next processing block (or stage). In one embodiment, ts_0 is generated at the first processing block and remains unchanged and is provided to the last processing block and ts_e the timestamp generated at the last completed processing block.

$$msg_i = <id, ts\_0, ts\_e, data> \quad (6)$$

Each processing block is activated for a set of data in sequence. There is no need to carry explicit $P_i$ and thus message size is minimized. For a pipeline flow with n stages processing an input generated or received at time t, the e2e delay d(t) may be represented by equation 7, where equation 5 holds true and where ts_0 is the initial or first input timestamp of the first processing block in the data processing pipeline.

$$d(t) = \Sigma_{k=1}^{n} c_k(t) = msg_n(ts\_e) - msg_n(ts\_0) \quad (7)$$

If the message is received at the last stage (or processing block), and the overall data processing rate is greater than or equal to $R_{min}$ and less than $R_{tar}$, then the processing rate may be increased.

Figure 8:
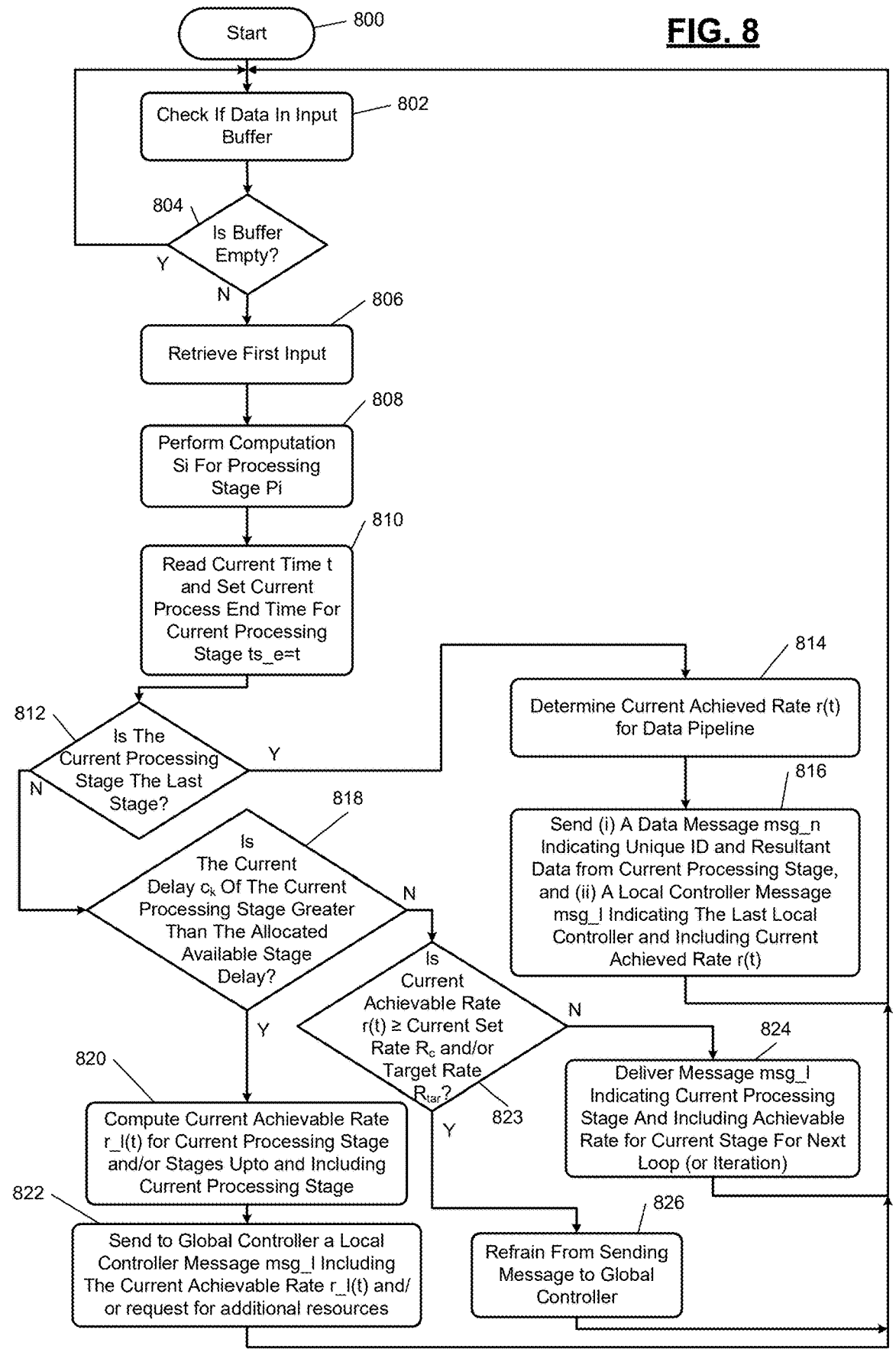
FIG. 8 illustrates an example local controller processing rate determination and reporting method in accordance with the present disclosure.

The following methods 8 and 9 may be performed by a local controller to make informed local controller decisions with regards to setting a data processing rate of the processing block of the local controller. This can affect decisions made by the other local controllers. For example, a rate reduction caused by one local controller causes a global controller to reduce the processing rates of the other local controllers. FIG. 8 shows a local controller processing rate determination and reporting method. The method may be performed by any of the above-stated local controllers. The local controller makes informed local decisions. The local controller may locally store the following information: $B_i$, d(t), $d_i$, and $R_{min}$, which may be obtained offline; the current set flow rate $R_c$, which was last set by the global controller and may be received in previous global controller broadcast rate change message msg_g (the initial current set flow rate $R_c$ may equal the target flow rate $R_{tar}$); the most recent $c_i(t)$ to determine resource bottleneck (or processing block causing a data bottleneck situation); and a count threshold H for rate recovery. The local controller communicates (i.e. exchanges signals) only with a global controller (e.g., the global controller 602 of FIG. 6).

The following operations may be iteratively performed. The method may begin at 800. At 802, the local controller checks if data is in the input buffer (e.g., one of the buffers 606 of FIG. 6). At 804, the local controller proceeds to operation 806 if the buffer is empty, otherwise the local controller proceeds to operation 806.

At 806, the local controller retrieves the first input (or first set of data) input into the buffer. At 808, the local controller performs the corresponding algorithm (or computation $S_i$). At 810, the local controller reads current time t and sets current process end time (or end timestamp) for current processing stage ts_e equal to time t.

At 812, the local controller determines whether the current processing stage is the last stage n. If yes, operation 814 is performed, otherwise operation 818 is performed. At 814, the local controller determines a current achievable rate r(t) for the data pipeline. The local controller may monitor its input buffer fill rate, data received times and data output times of the processing block of the local controller and based on this information determine a current achievable rate.

At 816, the local controller sends (i) a data message msg_n indicating the last local controller and resultant data from current processing stage, and (ii) a local controller message msg_l indicating the last local controller and including current achieve rate r(t). The message msg_n may have the same format as msg_i, but be for the last local controller. An example message to be sent from the local controller to a global controller is represented by equation 8, where $LC_i$ identifies the current (or $i^{th}$) local controller, and $r_i(t+1)$ refers to the updated achievable rate for the current local controller.

$$msg\_l = <LC_i, r_i(t+1)> \quad (8)$$

At 818, the local controller determines whether the current delay $c_k$ of the current processing stage is greater than the allocated available stage delay. If yes, operation 820 is performed otherwise operation 823 is performed. At 820, the local controller determines the current achievable rate r_l(t) for the current processing stage and/or stages up to and including the current processing stage. At 822, the local controller sends to the global controller a local controller message msg_l including the current achievable rate r_l(t). At the end of processing for the $i^{th}$ processing block $P_i$, the message msg_l is sent to the global controller when the end timestamp ts_e minus the initial (or start) timestamp is greater than the delay $d_i$, which indicates that $r(t)<R_{min}$. The general controller is immediately notified if $R_{min}$ cannot be satisfied.

At 823, the local controller determines whether the current achievable rate r(t) is greater than or equal the current set rate $R_c$ and/or the target rate $R_{tar}$. If the current achievable rate r(t) is greater than or equal to $R_c$ and/or $R_{tar}$, then no message is sent to the global controller, as represented by operation 826, otherwise operation 824 is performed. In one embodiment, if the local controller is able to process the received data on time (i.e. satisfy $R_c$), then the local controller sends result of the processing to the next processing stage or module and/or device downstream without sending a signal to the global controller.

At 824, the local controller sends a local controller message msg_l indicating the current processing stage and including an achievable rate for the current stage for a next loop (or iteration). Each processing stage is capable of determining an achievable processing rate for that processing stage and whether the processing stage is able to complete processing data on time for the current set processing rate. A fast fall back approach is performed when the current achievable rate r(t) is greater than $R_{min}$, but less than $R_{tar}$. The rate is reduced quickly to prevent backup of data due to one stage not keeping up with the current set rate. This includes one of the local controller indicating an achievable rate. In one embodiment, only one of the local controllers sends a message to the global controller during an iteration of processing a set of data through the data processing pipeline.

Operation 802 may be performed subsequent to operations 816, 822, 824, and 826.

Figure 9:
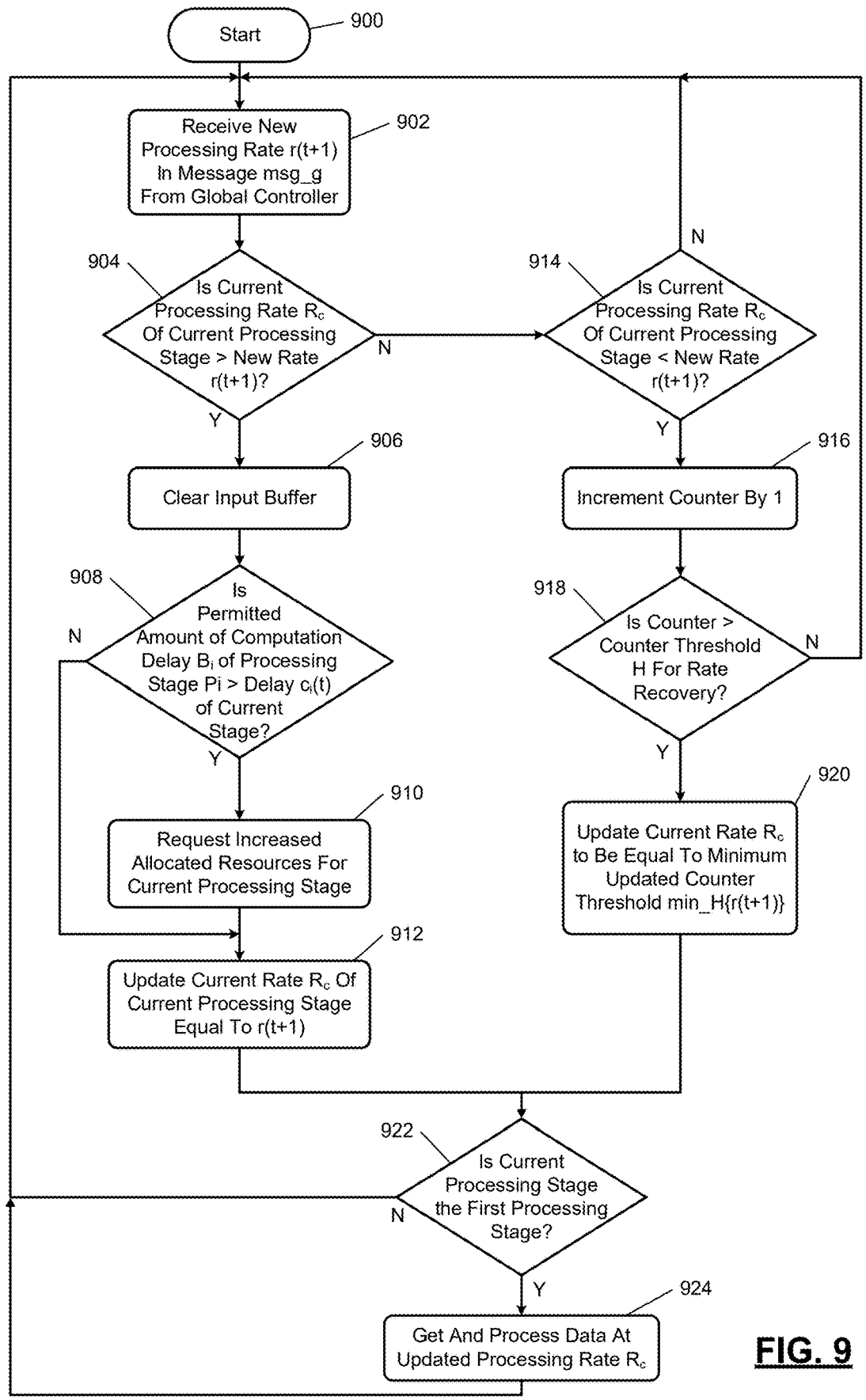
FIG. 9 illustrates an example local controller adaptive processing rate control method in accordance with the present disclosure.

FIG. 9 shows a local controller adaptive processing rate control method. The following operations may be iteratively performed. The following operations may be iteratively performed. The method may begin at 900. At 902, in response to the message sent at 824 of the method of FIG. 8, the local controller receives a message from the global controller (e.g., global controller 602 of FIG. 6). The global controller message msg_g=<r(t+1)> indicates the new processing rate r(t+1) for the local controller to satisfy. This rate is broadcasted from the global controller to the local controllers.

At 904, the local controller determines whether the current processing rate $R_c$ of the current processing stage $P_i$ is greater than the new rate r(t+1). If yes operation 906 is performed, otherwise operation 914 is performed.

At 906, the local controller clears the input buffer of the processing block of the local controller. This stops the current processing and clears the buffer to receive and process most recent data. This is done at all processing blocks (or stages) of the processing pipeline.

At 908, the local controller determines whether the permitted amount of computation delay $B_i$ of the processing stage of the local controller is greater than the delay $c_i(t)$ of the current stage. If yes, operation 910 is performed, otherwise operation 912 is performed.

At 910, the local controller requests for increased allocated resources for the current processing stage, such as additional allocated processing time of a processor. Each processing block (or stage) requests increase resources if that processing block is causing a bottleneck. At 912, the local controller updates the current rate $R_c$ of the current processing stage $P_i$ to be equal to the new rate r(t+1).

At 914, the local controller determines whether the current processing rate $R_c$ of the current processing stage $P_i$ is less than the new rate r(t+1). At 916, the local controller increments a counter by 1. This is to start recovery to at least the new rate r(t+1) with small amount of rate increase for each loop (or iteration) of the data pipeline. In one embodiment, H incremental increases are performed respectively for H loops (or iterations) of the data processing pipeline to increase the current processing rate $R_c$ to the new rate r(t+1).

At 918, the local controller determines whether the value of the counter is >the counter threshold H for rate recovery. If yes operation 920 is performed, otherwise operator 902 is performed. Counting to the threshold H ensures stability.

At 920, the local controller updates the current rate $R_c$ to be equal to a minimum updated counter threshold min_H{r(t+1)}.

Operations 916, 918 and 920 are performed to slowly ramp up the processing rate to prevent overshooting the achievable processing rate, minimize the probability of reducing the processing rate again, and maintain a stable reliable processing system. As an example, the global controller may increment the current set rate 2 f/s or less until reaching the minimum achievable processing rate and/or the target processing rate $R_{tar}$. When the current achievable rate of the local controller drops subsequent to performing operations 914, 916, 918, 920 and/or when operations 914, 916, 918, 920 are performed for another local controller, the counter may be reset to an initial value. In one embodiment, each local controller has a designated counter.

At 922, the local controller determines whether the current $i^{th}$ processing stage $P_i$ is the first processing stage of the corresponding data processing pipeline. If yes, operation 924 is performed, otherwise operation 902 is performed. At 924, the local controller receives and processes data at the updated processing rate $R_c$ that was set at 912 or 920. Operation 902 may be performed subsequent to operation 924.

Figure 10:
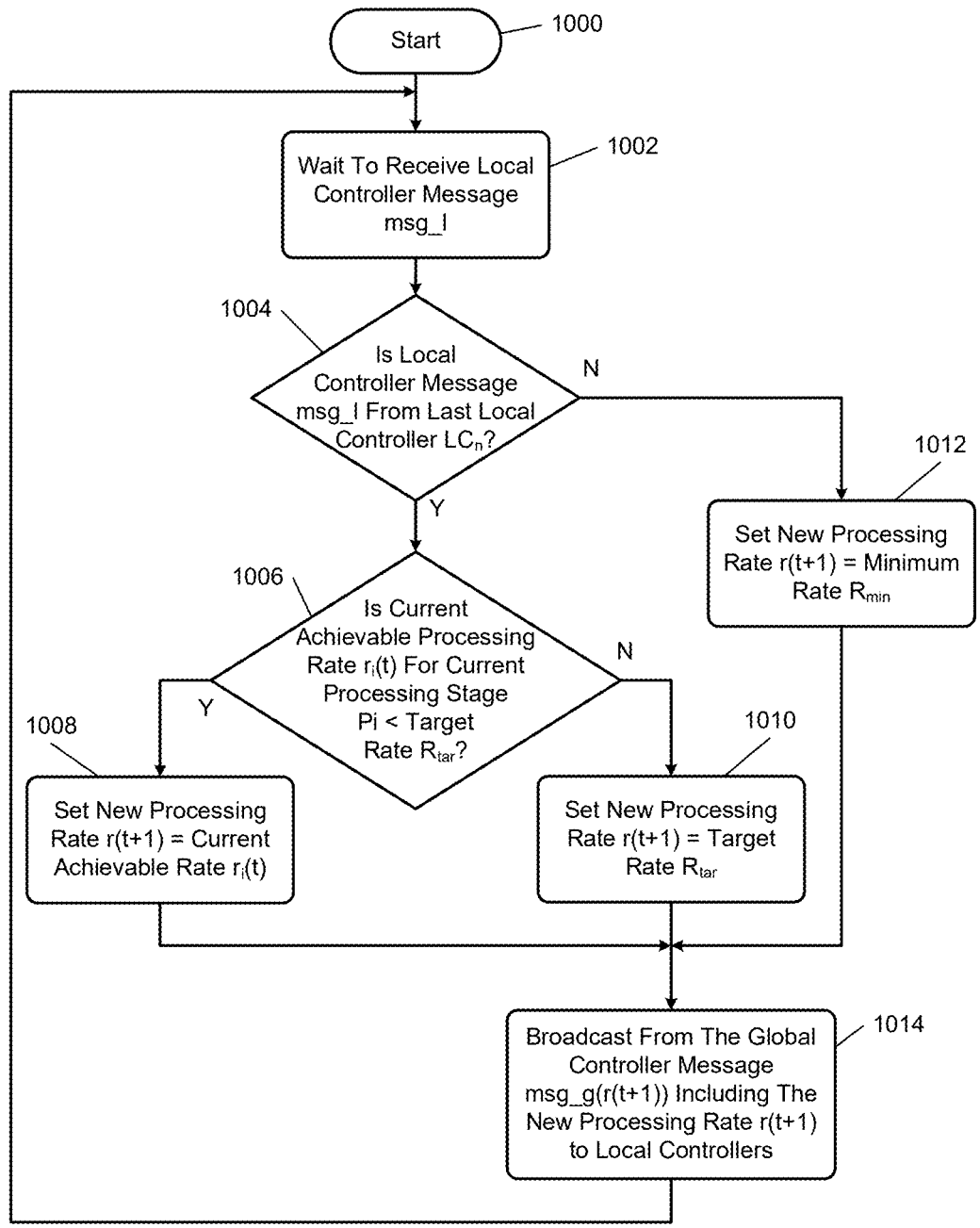
FIG. 10 illustrates an example global controller adaptive processing rate control method in accordance with the present disclosure.

FIG. 10 shows an example global controller adaptive processing rate control method during which the global controller makes cooperative global decisions. The following operations may be iteratively performed. This method may be performed between the methods of FIGS. 8 and 9. The following operations may be iteratively performed. The method may begin at 1000. At 1002, the global controller waits to receive local controller message msg_l indicating the current achievable rate of the processing block (or stage) of that local controller. Once received, the global controller at 1004 determines whether the local controller message msg_l is from the last local controller $LC_n$. If yes, operation 1006 is performed, otherwise operation 1012 is performed.

At 1006, the global controller determines whether the current achievable processing rate $r_i(t)$ for the current processing stage Pi is less than the target rate $R_{tar}$. If yes, operation 1008 is performed, otherwise operation 1010 is performed. At 1008, the global controller sets the new processing rate r(t+1) equal to the current achievable rate $r_i(t)$. If additional computation time is available for processing, the global controller distributes this available time to the local controllers by adjusting the current set rate $R_c$ accordingly. At 1010, the global controller sets the new processing rate r(t+1) equal to the target rate $R_{tar}$. At 1012, the global controller sets the new processing rate r(t+1) equal to the minimum rate $R_{min}$.

At 1014, the global controller broadcasts the global controller message msg_g indicating the new processing rate r(t+1) to the local controllers of the data processing pipeline. Operation 1002 may be performed subsequent to operation 1014.

The global controller, during operations 1008, 1010, 1012, sets the new rate for the next loop (or iteration) of the data processing pipeline. In one embodiment, each of the local controllers indicates whether to maintain, decrease or increase the current data processing rate. The global controller may then reset to $R_{min}$ and/or reduce the rate to the minimum achievable rate of the local controllers.

In an embodiment, only one of the local controllers generates a message for the global controller. This provide implicit cooperation and minimum communication. In this embodiment, one round of communication occurs between the global controller and the local controllers. The global controller may receive only two types of input from the global controllers, as described above. The global controller then broadcasts the updated rate message to the local controllers, which then makes the appropriate rate adjustments if needed at each of the respective processing blocks.

The global controller executes a global controller algorithm. During this execution, if msg_l from a local controller is not for the last stage, the rate is reduced to $R_{min}$. If the msg_l is for the last stage, then the new (or updated) processing rate is a rate between $R_{min}$ and $R_{tar}$ but not greater than $R_{tar}$.

The above-described examples ensures continuous operation of a vehicle perception system when an overload condition exists and there is too much data to process in a given period of time. The examples provide two-level control (global and local) while introducing a minimal amount of overhead for both communication and computation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A perception processing system comprising:
a memory; and
a main controller comprising one or more processors comprising a plurality of modules configured to implement one data processing pipeline sequentially connected, wherein the data processing pipeline comprises a plurality of algorithm stages, wherein the plurality of algorithm stages are executed (i) in parallel relative to a plurality of different sets of data, and (ii) sequentially relative to each of the plurality of different sets of data, wherein the plurality of algorithm stages share resources of the plurality of modules and the memory to process the plurality of different sets of data and generate perception information, and
wherein
one of the plurality of modules is configured to execute a global controller and a plurality of local controllers,
the global controller is configured to set a processing rate for the plurality of local controllers,
the plurality of local controllers are allocated respectively to monitor a plurality of current processing rates of the plurality of algorithm stages,
in response to one of the plurality of current processing rates being less than the set processing rate, the corresponding one of the plurality of local controllers is configured to send a first signal to the global controller, and
the global controller is configured to send a broadcast signal to the plurality of local controllers to adjust the plurality of current processing rates based on the first signal.

2. The perception processing system of claim 1, wherein:
the plurality of modules comprise a central processing module and an accelerator module;
the one of the plurality of modules is implemented as the central processing module; and
the accelerator module is configured to assist the central processing module in executing the plurality of algorithm stages to process the plurality of different sets of data.

3. The perception processing system of claim 1, wherein:
the plurality of algorithm stages are implemented respectively by processing blocks having respective input buffers; and
the plurality of local controllers are configured to respectively determine the plurality of current processing rates based on at least one of (i) an initial timestamp of a first in series one of the processing blocks, (ii) timestamps of when data is received at the input buffers, or (iii) timestamps of when the processing blocks finish processing data.

4. The perception processing system of claim 3, wherein the global controller and the plurality of local controllers are configured to:
when the one of the current processing rates is less than the set processing rate for one of the processing blocks, clear the input buffers of the processing blocks and adjust operation of the plurality of local controllers to a minimum processing rate; and
when a current achievable processing rate for the one of the processing blocks is greater than the minimum processing rate, ramp up processing speeds of the processing blocks from the minimum processing rate to at least one of a current set rate set by the global controller or a target rate, wherein the target rate is greater than or equal to the current set rate.

5. The perception processing system of claim 1, wherein:
only one of the plurality of local controllers signals the global controller during a processing iteration of the data processing pipeline; and
the global controller sends the broadcast signal to the plurality of local controllers in response to the one of the plurality of local controllers signaling the global controller.

6. The perception processing system of claim 1, wherein:
one of the plurality of local controllers signals the global controller at least one of (i) a current processing rate of a processing block of the one of the plurality of local controllers, or (ii) a current achievable processing rate of the processing block; and
the global controller sets an updated processing rate for the plurality of local controllers in response to the one of the plurality of local controllers signaling the global controller.

7. The perception processing system of claim 1, wherein one of the plurality of local controllers is configured to request additional resources when a current delay of a processing stage of the one of the plurality of local controllers is greater than an allocated available stage delay for the processing stage of the one of the plurality of local controllers.

8. The perception processing system of claim 1, wherein each of the plurality of local controllers are configured to refrain from sending a message to the global controller when a current achievable processing rate of that local controller is greater than or equal to a target processing rate for the data processing pipeline.

9. The perception processing system of claim 1, wherein:
the first signal indicates an achievable processing rate for the corresponding one of the plurality of local controllers; and
the global controller is configured to generate the broadcast signal to adjust the plurality of current processing rates to the achievable processing rate.

10. The perception processing system of claim 1, further comprising:
a sensor configured to generate the plurality of different sets of data; and
the main controller is configured to control operation of at least one actuator based on the perception information.

11. A perception processing method comprising:
implementing, via a main controller, one data processing pipeline sequentially connected, wherein the data processing pipeline comprises a plurality of algorithm stages, wherein the main controller comprises a plurality of modules;
executing, via the plurality of modules, the plurality of algorithm stages (i) in parallel relative to a plurality of different sets of data, and (ii) sequentially relative to each of the plurality of different sets of data, wherein the plurality of algorithm stages share resources of the plurality of modules and a memory to process the plurality of different sets of data and generate perception information;
via one of the plurality of modules, executing a global controller and a plurality of local controllers;
setting a processing rate for the plurality of local controllers via the global controller;
monitoring a plurality of current processing rates respectively of the plurality of algorithm stages via the plurality of local controllers, wherein the plurality of local controllers are allocated respectively for the plurality of algorithm stages;
determining the plurality of current processing rates respectively via the plurality of local controllers based on at least one of (i) an initial timestamp of a first processing block, (ii) timestamps of when data is received at input buffers, or (iii) timestamps of when a plurality of processing blocks finish processing data, wherein
the plurality of algorithm stages are implemented respectively by the plurality of processing blocks,
the plurality of processing blocks respectively include the input buffers, and
the plurality of processing blocks include the first processing block;
when one of the current processing rates is less than the set processing rate, sending from the corresponding one of the plurality of local controllers a first signal to the global controller; and
sending a broadcast signal from the global controller to the plurality of local controllers to adjust the plurality of current processing rates based on the first signal.

12. The perception processing method of claim 11, further comprising assisting, via an accelerator module, a central processing module in executing the plurality of algorithm stages to process the plurality of different sets of data, wherein:
the plurality of modules comprise the central processing module and the accelerator module; and
the one of the plurality of modules is implemented as the central processing module.

13. The perception processing method of claim 11, further comprising:
when the one of the current processing rates is less than the set processing rate for one of the processing blocks, clearing the input buffers of the plurality of processing blocks and adjusting operation of the plurality of local controllers to a minimum processing rate; and
when a current achievable processing rate for the one of the processing blocks is greater than the minimum processing rate, ramping up processing speeds of the processing blocks from the minimum processing rate to at least one of a current set rate set by the global controller or a target rate, wherein the target rate is greater than or equal to the current set rate.

14. The perception processing method of claim 11, further comprising:
signaling only once from only one of the plurality of local controllers the global controller during a processing iteration of the data processing pipeline; and
sending from the global controller the broadcast signal to the plurality of local controllers in response to the one of the plurality of local controllers signaling the global controller.

15. The perception processing method of claim 11, further comprising:
signaling, via one of the plurality of local controllers, the global controller at least one of (i) a current processing rate of a processing block of the one of the plurality of local controllers, or (ii) a current achievable processing rate of the processing block; and
setting an updated processing rate via the global controller for the plurality of local controllers in response to the one of the plurality of local controllers signaling the global controller.

16. The perception processing method of claim 11, further comprising refraining, via each of the plurality of local controllers, from sending a message to the global controller when a current achievable processing rate of that local controller is greater than or equal to a target processing rate for the data processing pipeline.

17. The perception processing method of claim 11, further comprising generating, via the global controller, the broadcast signal to adjust the plurality of current processing rates to an achievable processing rate,
wherein the first signal indicates the achievable processing rate for the corresponding one of the plurality of local controllers.

18. The perception processing method of claim 11, further comprising:
generating the plurality of different sets of data via at least one sensor; and
controlling operation of at least one actuator based on the perception information.

19. A perception processing method comprising:
implementing, via a main controller, one data processing pipeline sequentially connected, wherein the data processing pipeline comprises a plurality of algorithm stages, wherein the main controller comprises a plurality of modules;
executing, via the plurality of modules, the plurality of algorithm stages (i) in parallel relative to a plurality of different sets of data, and (ii) sequentially relative to each of the plurality of different sets of data, wherein the plurality of algorithm stages share resources of the plurality of modules and a memory to process the plurality of different sets of data and generate perception information;
via one of the plurality of modules, executing a global controller and a plurality of local controllers;
setting a processing rate for the plurality of local controllers via the global controller;
monitoring a plurality of current processing rates respectively of the plurality of algorithm stages via the plurality of local controllers, wherein the plurality of local controllers are allocated respectively for the plurality of algorithm stages;
when one of the plurality of current processing rates is less than the set processing rate, sending from the corresponding one of the plurality of local controllers a first signal to the global controller;

sending a broadcast signal from the global controller to the plurality of local controllers to adjust the plurality of current processing rates based on the first signal; and requesting, via one of the plurality of local controllers, additional resources when a current delay of a processing stage of the one of the plurality of local controllers is greater than an allocated available stage delay for the processing stage of the one of the plurality of local controllers.

* * * * *